May 1, 1934.   J. H. MILLER   1,957,074
METHOD AND APPARATUS FOR TESTING THERMIONIC TUBES
Filed May 1, 1931    4 Sheets-Sheet 1

Inventor
John H. Miller
By Williams, Bradbury, McCaleb
& Hinkle.
Attys.

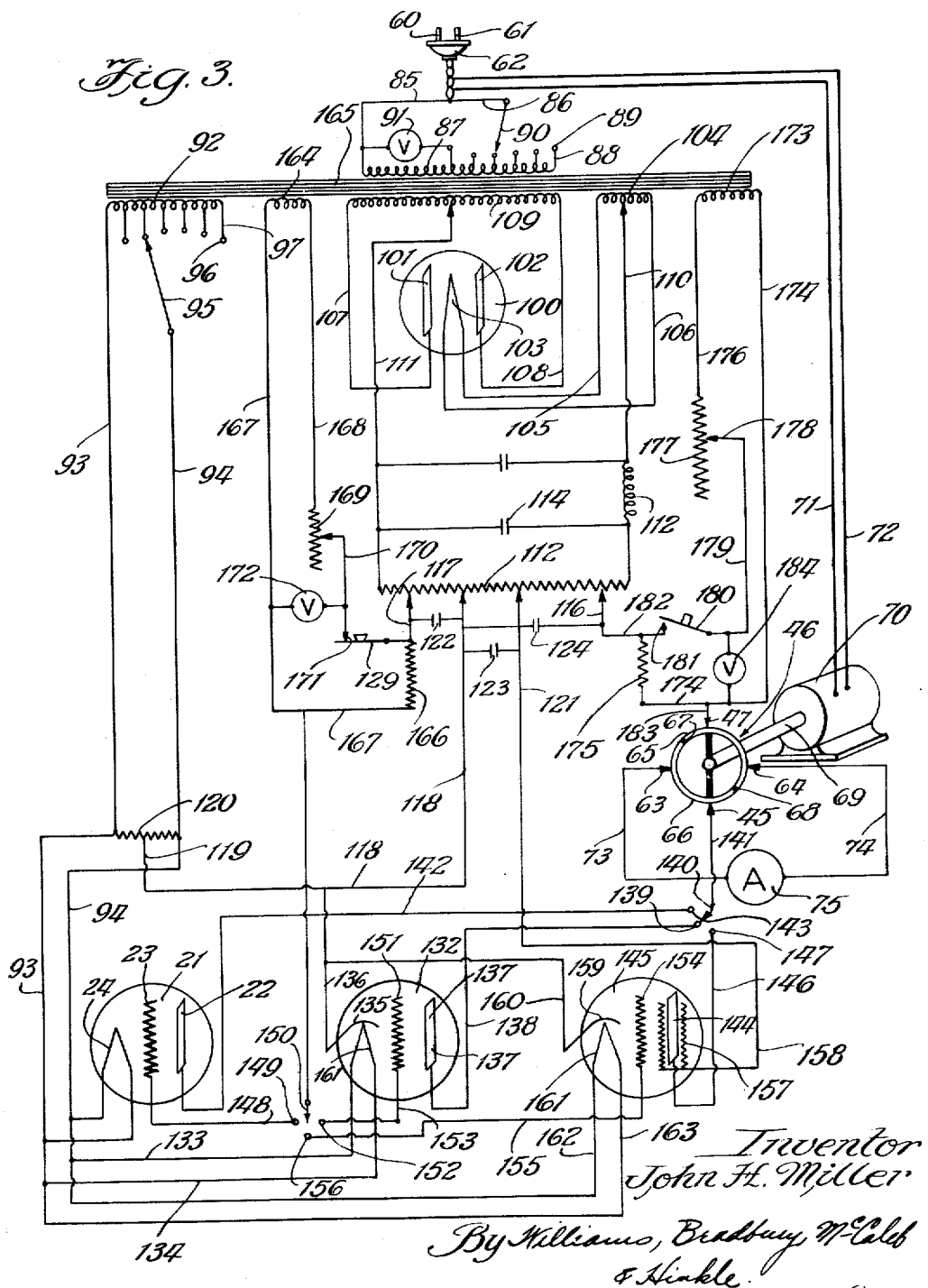

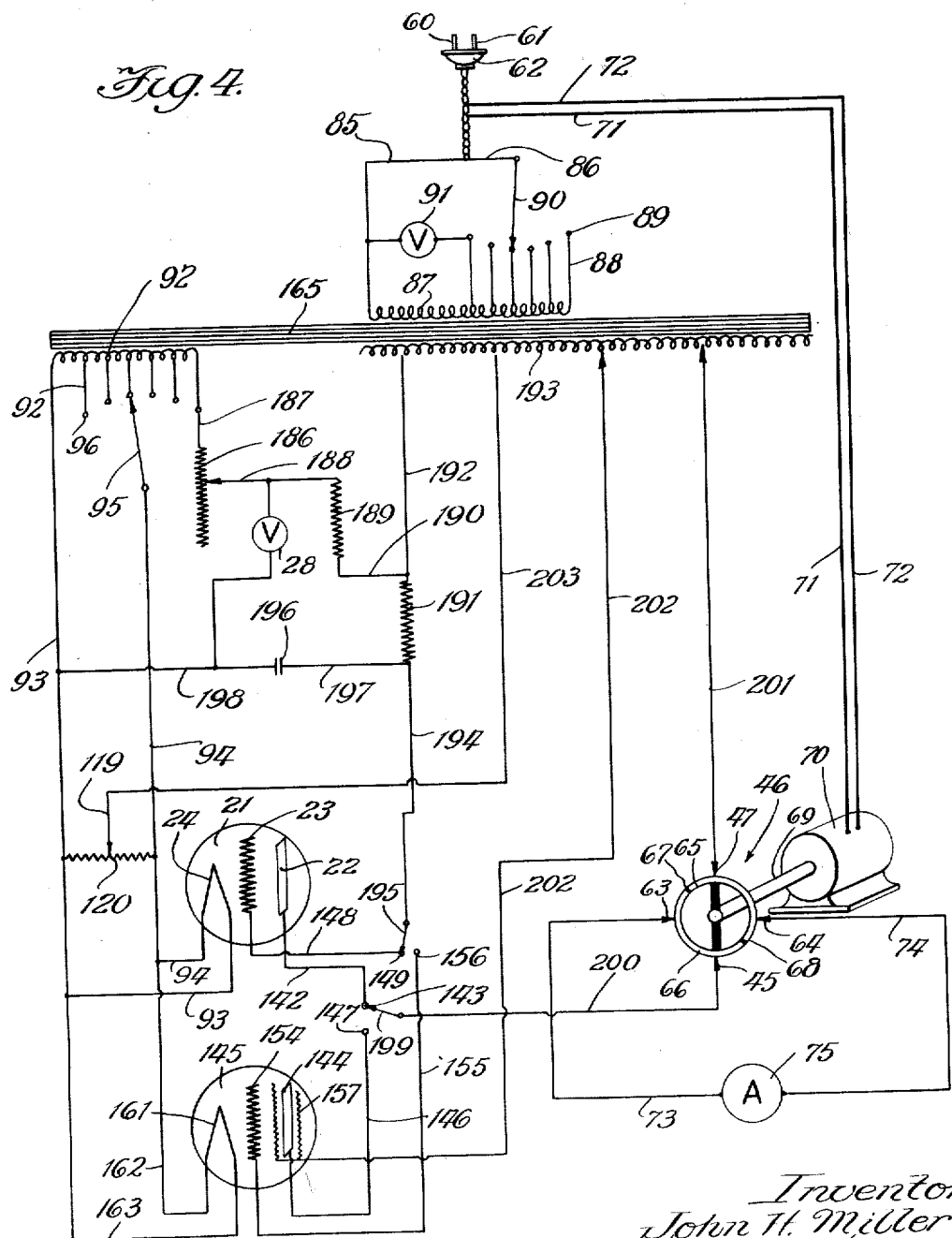

May 1, 1934.   J. H. MILLER   1,957,074
METHOD AND APPARATUS FOR TESTING THERMIONIC TUBES
Filed May 1, 1931   4 Sheets-Sheet 4
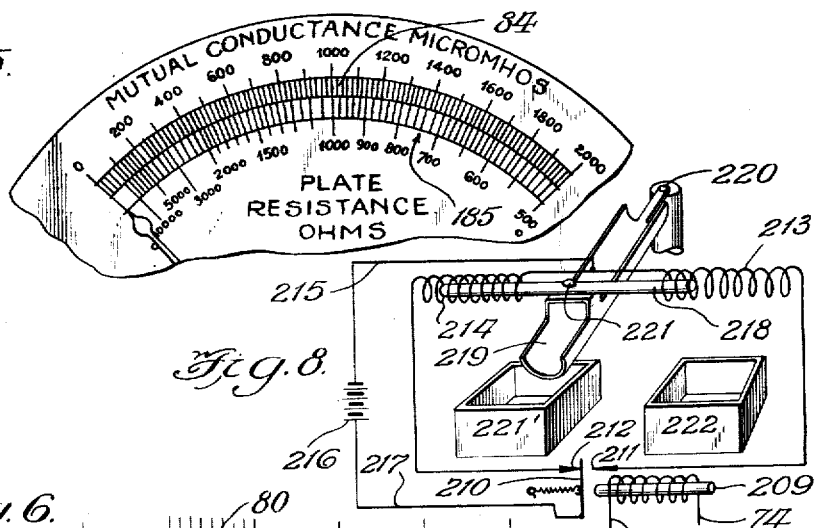
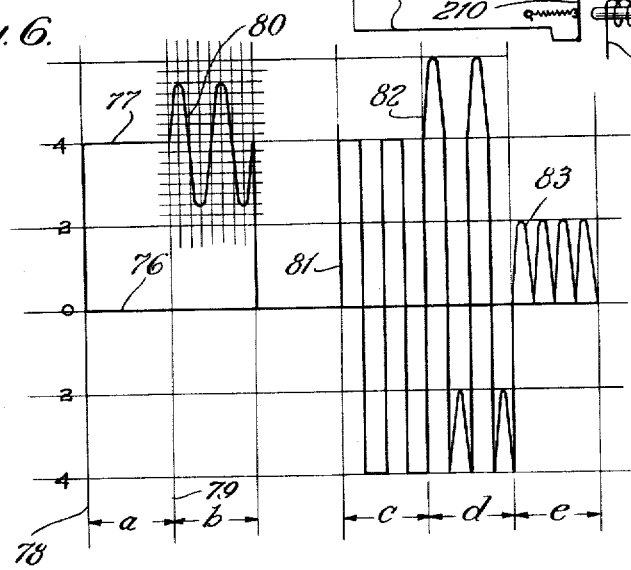
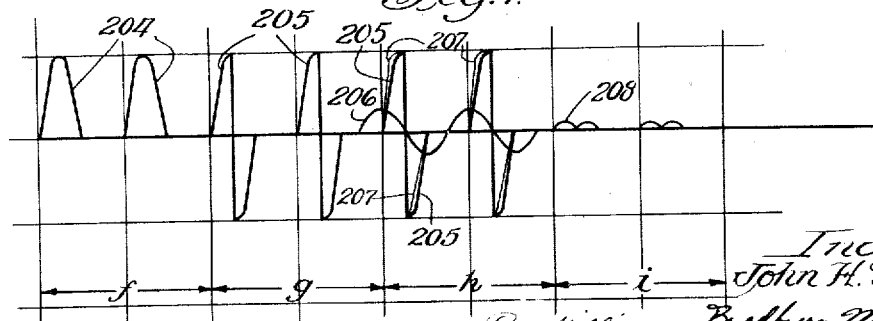
Inventor
John H. Miller
By Williams, Bradbury, McCaleb
& Hinkle   Attys.

Patented May 1, 1934

1,957,074

UNITED STATES PATENT OFFICE 1,957,074

METHOD AND APPARATUS FOR TESTING THERMIONIC TUBES

John H. Miller, Oak Park, Ill., assignor, by mesne assignments, to Jewell Electrical Instrument Company, a corporation of New Jersey Application May 1, 1931, Serial No. 534,314

15 Claims. (Cl. 250—27)

The present invention relates to electron tube testing devices, and methods, and is particularly concerned with testing devices for determining the worth of an electron tube.

The best single criterion of the worth of a vacuum tube is the mutual conductance of the tube, but the measure of this constant of the tube, usually involves the taking of several measurements and a calculation, or the performance of a number of manual operations for securing the same result with the testing devices of the prior art.

One of the objects of the present invention, is the provision of an improved electron tube tester, capable of directly indicating the mutual conductance and/or plate resistance of a tube without the necessity for calculation, nor the necessity for a number of manual operations in the testing of each tube.

Another object is the provision of an improved testing device, which is capable of rapid and economical operation in the testing of tubes, by virtue of a substantial reduction in the amount of labor and mental effort necessary for determining the worth of tubes.

Another object is the provision of an improved method and/or testing device, which accomplishes the testing of tubes by determining the mutual conductance and/or plate resistance with a high degree of accuracy.

Another object is the provision of an improved testing device, which may also be energized solely from alternating current sources, such as the ordinary lighting circuit, so that the tester may be employed wherever such a source is available, without the necessity for special batteries.

Another object is the provision of an improved testing device adapted to employ the d'Arsonval type of direct current instrument, for directly indicating the mutual conductance and/or plate resistance of the tube in order to utilize the low resistance, high sensitivity, and high accuracy characteristics of such an instrument.

Another object is the provision of an improved testing device by means of which a low voltage measuring instrument may be employed, which is calibrated to measure relatively small electrical quantities with a high degree of accuracy, by virtue of the arrangement whereby the instrument measures only the increment of change of electrical conditions in the electron tube, rather than the total current or voltage impressed upon the tube.

Another object is the provision of an improved method or apparatus for testing electron tubes, which is particularly adapted for high speed testing, such as it would be desirable to use in the testing of tubes in large quantities.

Other objects and advantages of the invention will be apparent from the following description, and from the accompanying drawings, in which similar characters of reference indicate similar parts throughout the several views.

Referring to the drawings, of which there are four sheets;

Fig. 3 is a similar view of another modification which is also adapted to determine the plate resistance of various types of tubes;

Fig. 4 is a similar view of another modification of a more simple type for determining the mutual conductance;

Fig. 5 is a fragmentary view of the dial of the instrument, for directly indicating mutual conductance or plate resistance;

Fig. 6 is a diagrammatic illustration of the curves which are useful in explaining the principle of operation of the invention, of the types shown in Figs. 1 to 3;

Fig. 7 is a similar diagrammatic view of curves for explaining the operation of the embodiment of Fig. 4;

Fig. 8 is a diagrammatic illustration of an arrangement for automatically separating tubes into lots of accepted or rejected tubes, which device may be substituted for the indicating apparatus or meter in any of the embodiments shown.

Figure 1:
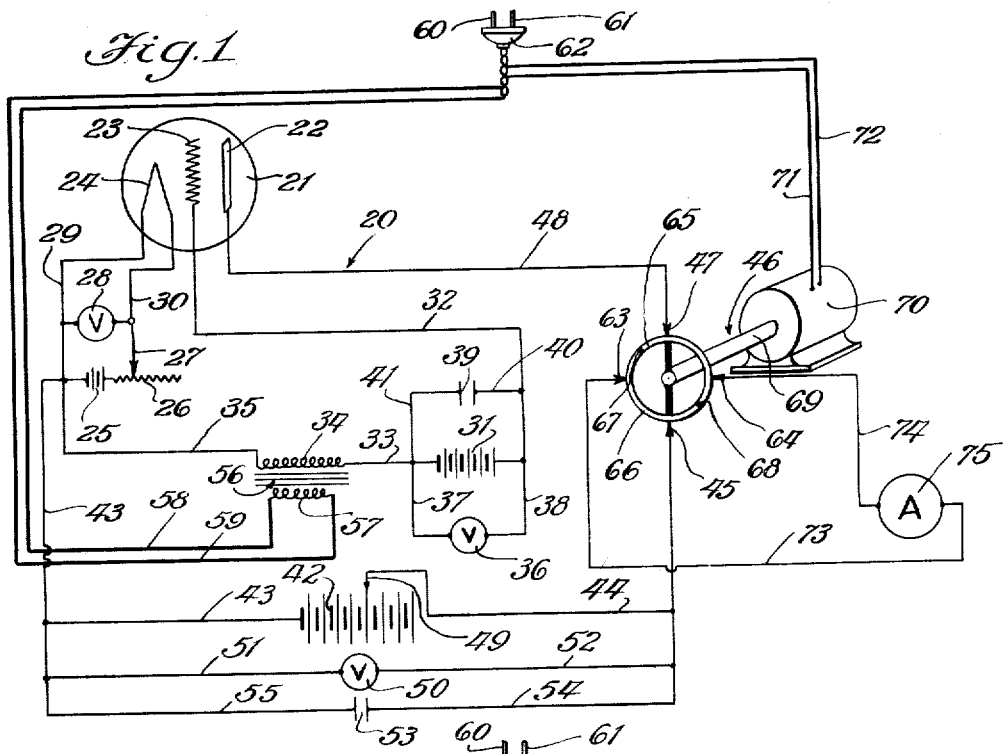
Fig. 1 is a diagrammatic illustration of the circuits and auxiliary apparatus of an electron tube tester constructed according to the present invention.

The tube testing devices constructed according to the present invention, preferably are enclosed in an appropriate casing with the necessary sockets, instruments, switches and auxiliary leads carried by the casing in a convenient manner, but the present application relates particularly to the improved method of testing, and the arrangement of the circuits and apparatus for carrying out the method, and consequently the circuits and apparatus have merely been illustrated diagrammatically. Referring to Fig. 1, this is a diagrammatic illustration of the circuits and apparatus which may be employed for directly measuring and indicating the mutual conductance of vacuum tubes with a high degree of accuracy, and the apparatus and circuits of this device will now be described in detail.

The tester, which is indicated in its entirety by the numeral 20, is preferably provided with one or more vacuum tube sockets capable of receiving any type of vacuum tube 21. The four prong type of socket is illustrated, for example, but the device may be provided with sockets and leads for each type of tube as illustrated in Fig. 3, with a selective switching device or adapters and leads may be employed with a five prong socket to adapt the tester for any type of tube. It should be understood that the diagrammatic representations 22 for the plate, 23 for the grid, and 24 for the filament or heater, correspond to a tube placed in the socket 21, which socket is provided with the usual contacts for engaging the terminals of tubes.

The filament may be energized by a battery 25, the voltage being controlled by a rheostat 26 having an adjustable contact 27 and measured by a voltmeter 28. For this purpose, one terminal of the battery 25 is connected by a conductor 29 to one terminal of the filament 24, and the opposite terminal of battery 25 is connected through rheostat 26 and conductor 30, to the other terminal of filament 24.

The grid 23 is adapted to be energized by a battery 31 which has one terminal connected by a conductor 32 to the grid and the opposite terminal connected by a conductor 33 to the secondary 34 of a transformer, which is in turn connected by conductor 35 to filament conductor 29. A voltmeter 36 is connected to the terminals of grid battery 31 by conductors 37 and 38 and a condenser 39 is shunted around battery 31 to by-pass alternating current components around the battery resistance 31. Thus, the condenser 39 is connected by a conductor 40 to conductor 32, and the opposite terminal of the condenser 39 is connected by conductor 41 to conductor 33.

The plate 22 may be energized by a plate battery 42 which has one terminal connected by a conductor 43 to the filament conductor 29. The opposite terminal of plate battery 42 is connected by a conductor 44 to one of the brushes 45 of a reversing unit, indicated in its entirety by the numeral 46. The oppositely located brush 47 is connected by conductor 48 to plate 22.

The proper plate voltage may be adjusted by the use of a switch 49 or by the use of an appropriate number of cells in the battery 42, and measured by means of the voltmeter 50, which is connected by conductors 51 and 52 to conductors 43 and 44, respectively. A condenser 53 is shunted around battery 42 in order to by-pass the alternating current components around the resistance of battery 42 and to eliminate the battery resistance from the plate circuit to oscillatory conditions. One terminal of condenser 53 is connected by conductor 54 to conductor 44, and the opposite terminal by conductor 55 to conductor 43.

The grid circuit includes the secondary 34 of a transformer 56, which is adapted to give a substantially constant alternating current potential when the primary 57 is properly excited, for example, by connection to the ordinary 60 cycle, 110 volt lighting circuit. For this purpose, the terminals of primary 57 are connected by conductors 58 and 59 to the contact prongs 60 and 61 of a socket connection plug 62 of the type adapted to engage an ordinary wall socket.

Various predetermined alternating current potentials may be impressed on the grid, but the ratio of the number of turns of the primary 57 to that of the secondary 34, is preferably such that the voltage is stepped down to one volt on the secondary. This voltage, which is exemplary of the preferred value, simplifies calculations by making one of the quantities unity. It is a very suitable value for the change of grid voltage in a test for mutual conductance for the usual range of vacuum tubes in use at the present time, and it enables instruments of good characteristics, with regard to torque, sensitivity, instrument resistance, etc., to be used. It should be understood, however, that other voltages may be applied to test tubes of different characteristics requiring a greater or lesser change in grid voltage, to give a good test of mutual conductance.

The reversing unit 46 may also be termed a rectifier with respect to the alternating current component in the plate circuit, and it preferably consists of a commutating device consisting of a plurality of brushes 45, 47, 63, 64, and a pair of commutator segments 65, 66.

In the present example, the commutator segments 65, 66, each cover 180 degrees of the commutator circumference, being separated by very thin insulators 67, 68. For example, the space between the segments at the surface of the commutator may be about 2/1000 of an inch.

Various types of synchronous commutating or rectifying devices may be used, such as a synchronously operated vibrating rectifier or a reversing device consisting of an electrionic relay controlled to function synchronously with the alternating potentials impressed upon the grid.

In the present embodiment, the commutator is carried by the shaft 69 of a synchronous A. C. motor 70, which may be energized from the same source of alternating current as the transformer 56. The synchronous motor 70 may be operated at a speed of 1800 revolutions per minute, for example, and it may be energized by the motor supply leads 71, 72, which are also connected to the connector prongs 60, 61.

The brushes 63, and 64 are connected by conductors 73, 74, to the terminals of a measuring instrument 75, preferably a direct current milliammeter of the d'Arsonval type, so that the reversing unit 46 is adapted to periodically reverse the connections of the plate circuit with respect to the instrument 75 and the commutator 65, 66 is driven synchronously and in phase with the alternating current component of the plate circuit, so that the plate circuit is broken and connection reversed at the zero point of the wave in a device of the type of Fig. 1.

In order to appreciate the advantages of the apparatus just described and of the improved method of testing tubes, it is desirable to point out the disadvantages of the devices of the prior art in contrast to the advantages of the structure described.

The best single criterion of the operative value of a vacuum tube, is the mutual conductance usually rated in micromhos or microamperes (of the plate circuit) per volt (of the grid circuit). The principal function of a vacuum tube is to give a change in plate current for a change in grid voltage, and the relation between these changes, other things being equal, is a very good criterion of the worth of the tube.

The devices of the prior art generally require either the taking of a number of different readings and a subtraction of the values read, in order to determine the change in grid voltage and the change in plate current, or they necessitate a number of manual operations such as readjustment of a milliammeter to a zero value to neutralize or buck out the original plate current, so that only the increment is indicated. Furthermore, the devices of the prior art were not capable of giving as accurate results as the present testing device, and a very important feature of the present invention is the structure and arrangement whereby a direct current milliammeter of the d'Arsonval type may be used to measure the change in plate current directly, and give an indication of the mutual conductance of a high order of accuracy.

Various other types of measuring instruments, such as ratio meters and dynamometer instruments have been used in tube testers of other types operating upon different principles, but the dynamometer type of instrument is relatively insensitive as compared to a direct current of the d'Arsonval type, where the field is supplied by a large permanent magnet, and consequently the sensitivity attained through the use of dynamometer instrument is not of a sufficient high order to give rigorously exact results.

The reasons for this fact, are that there are a number of definite limitations on the capabilities of instruments of the dynamometer type, and these limitations are: (1) The relatively high resistance of the dynamometer type instrument of the necessary sensitivity; (2) The necessity to use a relatively low grid voltage shift to test the tube on the straight line portion of the grid voltage-plate current characteristic; and (3) The limitation of the strength of the field attainable in a dynamometer type instrument by the necessity to provide for necessary heat dissipation.

With regard to the first limitation, it is found that in order to secure sufficient torque in an instrument of the dynamometer type with a relatively small change in voltage on the grid, a very fine winding must be provided so that the instrument resistance is in the order of hundreds of ohms and entirely comparable to the plate resistance of the tube. In the mutual conductance test, it should be remembered that the instrument resistances are supposed to be negligible so that they do not affect the tube characteristics. This will be evident when it is considered that if the external resistance was quite high, the plate current would remain practically constant, since the external resistance would serve as a ballast.

It is thus evident that the d'Arsonval type of instrument with a relatively low resistance and a relatively high torque, is adapted to meet the conditions necessary in an instrument for measuring mutual conductance more perfectly than the dynamometer type of instrument, on account of the natural limitations of high resistance and relatively low sensitivity of the dynamometer type of instrument.

With regard to the second limitation, if a low resistance instrument of normal sensitivity were used and the change in grid voltage materially increased to get a sufficient indication, this is liable to cause the measurements to be made off the straight line portion of the grid voltage-plate current characteristic, whereas the assumption upon which accurate tests of this sort are made, is that the tests should be made upon the straight line portion, and this is particularly important on low power tubes.

With regard to the third limitation, the strength of the field of an instrument of the dynamometer type, is definitely limited by the natural facility of the field to dissipate heat and fields which are obtained by the expenditure of a few watts are insufficient to gain the sensitivity desired, but the strength of field is definitely limited in this regard without the use of very special arrangements for cooling such windings, particularly where a large amount of testing is to be done.

It will be evident, therefore, that the d'Arsonval type of direct current instrument is peculiarly adapted to give the best results on account of its relatively low resistance and high sensitivity, and the present testing device has been particularly adapted to permit the use of an instrument of this type. It should be understood, however, that the devices are not exclusively limited to the use of instruments of this type, except as set forth in the appended claims, provided an instrument be used which is capable of measuring direct current only, but the best results will be secured by the use of the d'Arsonval type of instrument.

The operation of a tester of the type shown in Fig. 1 will now be described in detail.

The tube may be connected as at 21, or appropriately connected in the circuit by the provision of a socket of the type required and by means of appropriate leads in the case of a screen grid tube, and the circuits energized by connecting the plug 62 with the ordinary lighting circuit. The voltage of the filament 24 may be adjusted by means of the rheostat 26 and measured by the voltmeter 28, and appropriate voltages may be impressed upon the plate 22 by battery 42, and on the grid 23 by battery 31.

The transformer 56 will superimpose upon the grid 23 an alternating potential of one volt (in the preferred embodiment) and the change in voltage on the grid will cause a corresponding periodic change in plate current.

The plate current caused by the ordinary energization of the tube is a direct current, while the change in plate current caused by the alternating potential on the grid is an alternating component of the plate current, the net result being a fluctuating plate current.

The commutator 65, 66 is synchronously operated with the changes in voltage on the grid 23 so as to interrupt the plate current at the zero point of the alternating current component and reverse the connections of the plate circuit with regard to the milliammeter 75. The direct current component in the plate current is thus transformed into an alternating current by the commutator 65, 66 and the alternating component of the plate current is thus transformed into a direct current. Since the milliammeter is incapable of indicating alternating current, the milliammeter measures only the alternating component of the plate current, which has been changed into direct current, and the milliammeter 75 thus indicates directly the change in plate current.

Referring to Fig. 6, this is a diagrammatic representation of the plate current under various conditions, plotted with respect to the zero abscissa 76, various sections of the curves being indicated by the sections $a$, $b$, $c$, $d$ and $e$. If the alternating excitation of the grid were omitted, the constant plate current flowing in the plate circuit would be represented by the straight line 77, which extends between the limit lines 78, 79 in section $a$.

With the reversing unit not operating, and the alternating current impressed on the grid by secondary 34 of transformer 56, the superposition of alternating current on the grid would cause an alternating component in the plate circuit, and the total plate current might be represented by the curve 80 which corresponds to a fluctuating direct current, or the combination of a constant direct current and an alternating current component as shown in section b.

If the alternating current were omitted, but the reversing unit or commutating device were operated with the tube normally excited, the commutator would reverse the connections of the milliammeter 75, so that the current through the meter 75 would be a direct current, periodically reversed in direction as shown in section c of Fig. 6, and represented by the square-topped wave 81.

When both the reversing unit 46 and transformer 56 are operated, applying alternating potential to the grid and reversing the connections of the milliammeter in the plate circuit, the current flowing in the circuit of the instrument 75 may be represented by the curve 82 shown in Fig. 6, section d. This curve comprises a representation of the periodically reversed direct current with the alternating current component reversed and superposed upon the square-topped wave.

The average value of the instrument current represented by curve 82 of Fig. 6 in section d, is not zero, but may be represented by curve 83 of section e, and the average value comprises a pulsating direct current which is indicated on the direct current instrument. The direct current instrument 75 indicates the average value of the rectified component, but is not affected by the current represented by the square-topped wave in section c, since the average value of this component in the instrument circuit is zero.

The effect may also be considered as that of making alternating current of the direct current component of the plate circuit, which is not indicated on the direct current instrument, and of making a pulsating direct current of the alternating current component of the plate current, which is directly indicated on the direct current instrument. Through the use of this commutating device, the operator is enabled to measure the alternating current component of the plate current only, using a direct current instrument which has a sensitivity many times greater than that of an instrument of the dynamometer type, and also having a relatively low resistance, so that the resistance of the instrument does not materially affect the changes in plate current.

The reading of the milliammeter 75 is strictly proportional to the alternating component of the plate current, and I am thus enabled to use an instrument, the scale of which is calibrated to directly indicate the changes in plate current corresponding to a change in grid voltage of unity.

The use of an alternating current grid voltage component of one volt, enables the use of a direct current instrument having a very satisfactory scale for measuring the mutual conductances ranging up to about 2000 micromhos or 2000 microamperes per volt, which is capable of use with the present range of vacuum tubes being used. Since the applied voltage of one volt alternating current is usually measured as its root mean square value, whereas the direct current instrument indicates the average value of the rectified component, and these are related by a ratio known as the form factor, which in the case of a pure sine wave, is equal to 1.11, the direct current indication will be less than the indication of an alternating current instrument. Furthermore, the short-circuiting of the instrument or periodic open circuit by the commutator 65, 66, may also reduce the amount of energy fed to the direct current instrument, but these factors are constant and can be evaluated, and the direct instrument properly calibrated to indicate the mutual conductance directly in micromhos.

It will be evident that the change in voltage being equal to unity, and the mutual conductance being equal to the ratio of the change in plate current to the change in voltage, the indication of the change in plate current by the milliammeter 75 may be equal to the mutual conductance or directly proportional thereto, even though different values of alternating potential are applied to the grid.

The milliammeter 75 is therefore provided with a graduated scale 84 with scale divisions and indicia ranging from zero to 2000, for indicating the mutual conductance of the tube directly, as shown in Fig. 5.

This scale may be calibrated directly by using a vacuum tube, the constants of which are known, having been evaluated by a laboratory bridge measurement; and by making a set of readings, the scale of the instrument may be calibrated in terms of mutual conductance. A predetermined scale may also be used and the sensitivity of the direct current may be adjusted by means of an adjustment of the springs to indicate correctly the mutual conductance of the tube, and this is the preferred method of adjusting the calibration of the scale.

The measurement of mutual conductance by the method and apparatus described, has been found to be more exact than that obtained with any tube tester of any other type of which I am aware, and a comparison of the results secured by the use of this testing device and method, compares favorably with the results secured by very complicated laboratory equipment.

It is also desirable to provide a testing device which may be energized solely from the ordinary sources of alternating current, such as the lighting circuit, and for this purpose, the synchronous motor 70 may also drive an auxiliary rectifying device having rheostats in circuit for providing an appropriate supply of direct current to energize the plate, grid and filament.

Figure 2:
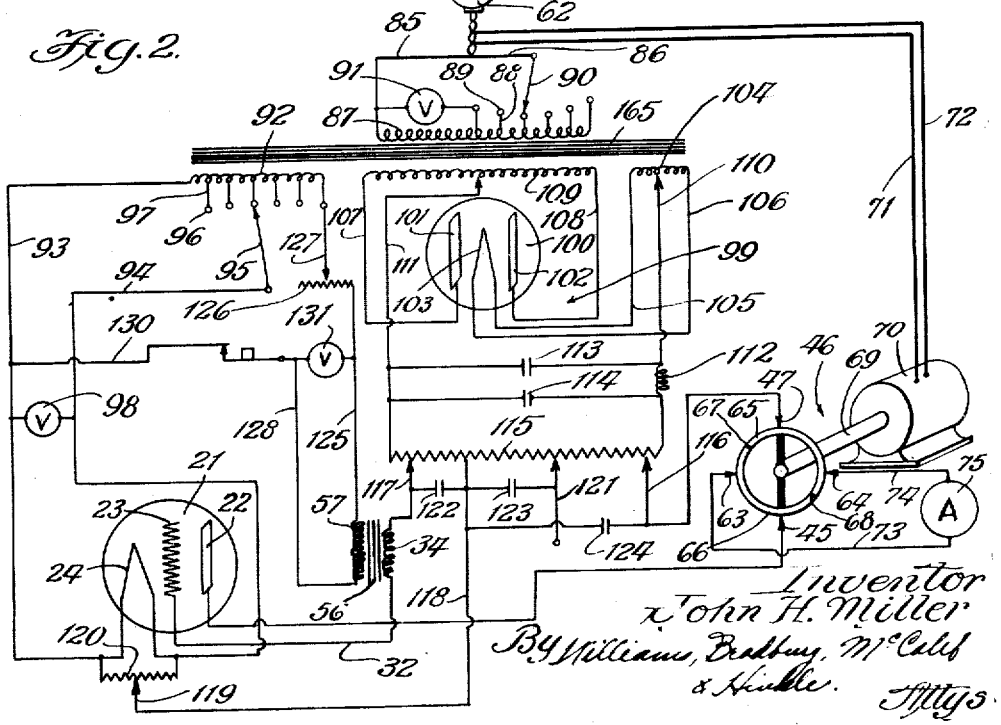
Fig. 2 is a similar view of another modification energized completely from a source of alternating current, such as the ordinary lighting circuit.

Referring to Fig. 2, this is a diagrammatic illustration of a modification arranged to be energized from the usual 110–115 volt alternating current lighting circuit. In this case the connection plug 62 is connected by conductors 85, 86 to the primary 87 of a supply transformer, which is preferably provided with a plurality of taps 88 leading to contacts 89 adapted to be engaged by a movable arm 90. Five per cent taps are sufficiently close for the regulation of filament, plate and grid voltages, although other values may be used and the proper tap may be selected according to the indication given by voltmeter 91.

The tube filament 24 may be energized from a secondary winding 92 through conductors 93, 94, the proper voltage for the particular tube being selected by a tap switch 95 adapted to engage the secondary contacts 96, which are connected to secondary taps 97 and if desired, a filament voltmeter 98 may be provided, but if the applied voltage is properly regulated by means of the voltmeter 91, the resulting filament voltage applied by the tap switch 25 may be indicated by indicia adjacent the tap contacts 96.

The plate and grid voltages may be supplied from a full wave vacuum tube rectifier system, indicated in its entirety by the numeral 99. The rectifier system may comprise a socket 100 having appropriate contacts for the plates 101, 102, and the terminals of filament 103, and the filament 103 may be energized from secondary winding 104 through conductors 105, 106. The plates 101, 102 may be connected by conductors 107, 108, respectively, to the respective terminals of a secondary winding 109.

The filament secondary 104 may be provided with a center tap 110 and the plate secondary 109 with a center tap 111, and the output of the tube in socket 100 may be filtered by a choke coil 112 and condensers 113, 114.

The output of the rectifier tube is placed across a resistance unit 115, which may be a variable resistance or supplied with a number of taps from which the direct current plate and grid voltage may be taken by selection of appropriate points by means of the taps 116 for plate current, and tap 117 for the grid supply. The plate and grid may be connected back to the filament through a common connection 118 connected to resistance 115, and to the adjustable contact 119 of a center tap resistor 120, which is connected across the terminals of filament 24, and which may be adjusted to secure a perfect balance.

The tap 121 is located at the proper point for a supply to the screen of a tetrode, and condensers 122, 123 and 124 are connected between taps 117, 118, 118—121 and 118—124 for by-passing the alternating component around the resistance 115.

The alternating current is applied to the grid by means of the secondary 34 of the transformer 56, having a primary 57, and the conductor 32 connects the grid 23 with the terminal of secondary 34. The primary 57 of transformer 56 may be connected by conductor 125 to rheostat 126, the adjustable arm 127 of which is connected to the terminal of secondary 92. The opposite terminal of primary 57 is connected by conductor 128 through a push button switch 129, and conductor 130, to the opposite terminal of transformer secondary 92 through conductor 93.

The alternating grid voltage which is superposed upon the grid by secondary 34, may be carefully adjusted by adjusting rheostat 126, 127 to the necessary voltage on the primary as indicated by voltmeter 131.

In this embodiment, the synchronous motor 70 and reversing unit may be exactly as described in the preceding embodiment and energized from the same alternating current source to control the connection to the milliammeter 75.

The operation of this embodiment is the same as the preceding embodiment, except that the energization may be supplied entirely from a source of raw alternating current, such as the ordinary lighting circuit, the grid and plate being energized from a rectifier system 99.

Referring to Fig. 3, this is a modification in which the testing device is adapted to receive a plurality of tubes controlled by a selective switch and which is also adapted to be used for directly measuring the plate resistance. The device of Fig. 3 includes circuits and apparatus substantially identical to that described in Fig. 2, and the socket 21 is associated with these circuits in the same manner for the testing of tubes having three electrodes.

The socket 132 is a five contact socket for the cathode-heater type of tube, the heater contacts being connected in parallel with the filament contacts of socket 21 by conductors 133, 134. The cathode 135 has its contact connected by a conductor 136 to the conductor 118, which leads back to the center tap resistor 120 of filament 24. The plate 137 of socket 132 is connected by conductor 138 to the fixed contact 139 adapted to be engaged by a selective switch arm 140, and the switch arm 140 is connected by conductor 141 to the brush 45. The plate 22 is connected by conductor 142 to another fixed contact 143, and the plate 144 of tetrode socket 145 is connected by conductor 146 to contact 147.

It will thus be observed that the selective switch arm 140 may be connected by either of contacts 143, 139 or 147 to energize the plate contacts of socket 21, 132, 145, respectively.

The grid 23 of socket 21 may be connected by conductor 148 to contact 149, adapted to be engaged by the movable switch member 150. Grid contact 151 of socket 132 may be connected to contact 152 by conductor 153, and the contact corresponding to grid 154 of socket 145 may be connected by conductor 155 to contact 156.

It will thus be observed that any one of the sockets 21, 132, 145 may have their grid circuits energized by the selective operation of the switch 150, or their plate circuits energized by the selective operation of the switch 140. If desired, the selective switches may be eliminated, however, and only one socket used at one time, the other contact being on open circuit by virtue of the absence of a tube from the socket.

The screen grid electrode 157 has its contact connected by a conductor 158 to the tap 121 for placing an appropriate potential on the screen grid. The socket 145 is also provided with an appropriate terminal contact for the cathode 159, which is connected by conductor 160 to conductor 136 and energized from tap 118.

In both the sockets 132, 145, the contacts corresponding to the terminals for the heater filament 161 are connected by conductors 162—163 and 133—134 to the filament energizing conductors.

It will also be evident from Fig. 3 that the source of alternating potential for the control electrode may consist of an auxiliary secondary winding 164 forming a part of the main transformer 165. This modification also employs in the grid circuit, an auxiliary resistance 166 which is of a low value so that it does not affect the tube characteristics. The resistance 166 has one terminal connected to the grid return conductor 117 and to the movable switch arm 129, and the opposite terminal connected by a conductor 167 to the secondary winding 164. The opposite terminal of the secondary winding 164 is connected by a conductor 168 to the rheostat 169, having a movable contact arm 170 which is connected to the fixed contact 171 of switch 129. The secondary windings in any of the devices described herein may consist of separate windings or a single winding with appropriate taps, but the grid and plate connections are preferably made so that the plate is positively energized when the grid is negatively energized.

In this embodiment, the alternating voltage which is impressed upon the grid of a tube under test, is taken from the secondary of the energizing transformer 165, and adjusted to an appropriate value as measured by the voltmeter 172, which also measures the drop across the resistance 166. The resistance 166 thus serves to permit the impressing of an additional alternating current voltage on the grid, without breaking the grid circuit, and if desired, this alternating voltage may be removed from the grid by pressing the push button which actuates switch 129 to open the circuit of transformer secondary 164. This switch is used to eliminate the alternating grid bias for the purpose of checking the zero reading of the instrument when the plate current is being converted into alternating current only by the reversing unit 46. If the instrument 75 does not have a correct zero reading under these conditions, the reading may be adjusted by adjusting the center tap 119 on the rheostat 120, after which the key 129 may be released and readings taken in a normal manner to determine the mutual conductance.

The modified apparatus of Fig. 3 is also adapted to measure the plate resistance by the introduction of alternating current into the plate circuit rather than the grid circuit. For this purpose, the transformer 165 may be provided with an auxiliary secondary winding 173, one terminal of which is connected by conductor 174 to a resistance 175, and the other terminal of which is connected by conductor 176 to a rheostat 177. The movable contact arm 178 of rheostat 177 is connected by a conductor 179 to the movable switch member 180, which is normally open but adapted to engage a fixed contact 181 which is connected by conductor 182 to the plate supply tap 116 and to resistance 175. Conductor 174 is also connected by a conductor 183 to brush 47.

The resistance 175 is preferably of a relatively low value so as not to affect the characteristics of the tube under test, but the alternating voltage applied by a secondary 173 to resistance 175 may be adjusted by rheostat 177, 178, and measured by the voltmeter 184. The switch key 180 may be normally open, and the switch key 129 normally closed, assuming that the mutual conductance test is the test which would be used most, but the normal positions of these switches might be reversed if it were desirable to arrange the apparatus so that it was normally in position for a plate resistance test.

The plate resistance is defined as the ratio of change in plate voltage to the change in plate current which it produces. In order to determine the plate resistance, the switch 129 is opened and the switch 180 closed, and the alternating component of the plate voltage may be adjusted to a fixed value as shown on voltmeter 184 by adjusting rheostat 177, 178. The alternating component of current in the plate circuit caused by this alternating voltage in the plate circuit, is then inversely proportional to the plate resistance, and the direct current milliammeter 75 which is fed through the commutator 65, 66 may be calibrated in terms of plate resistance, the scale being an inverse one like scale 185 in the lower part of Fig. 5.

The plate resistance may also be determined by adjusting the rheostat 177, 178 until the direct current instrument 75 indicates a predetermined value, and the value of plate resistance may then be read from the instrument 184 which may be provided with a direct scale appropriately calibrated to indicate plate resistance directly. In this case, the scale is a direct one, because the numerator is variable rather than the denominator of the fraction which represents plate resistance, namely:

$$R_p = \frac{\delta e_p}{\delta i_p}.$$

The amplification constant, mu, is defined as the ratio of the change in plate voltage to the change in grid voltage required to hold the plate current at a constant value. It may also be defined as the product of plate resistance and mutual conductance. It will, therefore, be possible to take the values of mutual conductance and plate resistance, as described above, multiply one by the other, and get the numerical value representing the amplification constant. However, this value may be taken directly through the use of the circuit, as shown in Figure 3, by means of another reading on the voltmeter 184.

The procedure to take this constant would be to press button 129 and apply a given alternating current voltage to the grid, adjusted by rheostat 169 to an established value, as indicated on voltmeter 172. This will result in a forward deflection of milliammeter 75, just as in taking the mutual conductance readings. If switch 180 is now pressed and an alternating plate voltage applied in reverse phase to the grid voltage, it will result in an alternating plate current component in opposite phase to that alternating plate current caused by the alternating grid voltage, and the reading of milliammeter 75, which indicates the total magnitude of the sum of these two alternating current plate components, will be reduced.

Rheostat 177 will then be adjusted by moving arm 178 until the reading of the milliammeter 75 is brought back to zero. When this occurs, it is obvious that the alternating plate current component has been reduced to zero, and referring to the definition, the plate current is not changed from its original value. Hence, the ratio of the plate voltage alternating current component to the grid voltage alternating current component represents the amplification constant. If the value of the alternating current grid voltage is held at a fixed value, either 1 volt or some other figure, then we may mark the values on voltmeter 184 of the alternating plate voltage directly in units representing the amplification constant of the tube under test.

The above procedure will then definitely allow the direct reading of the amplification constant from the dial of voltmeter 184 after manipulation of switches 189, 180, and rheostat 177.

All of the other circuits for appropriately energizing the tubes, may be substantially as described with respect to Fig. 2, and similar numerical indicia have been applied to similar circuit elements.

Referring to Fig. 4, this is a modification in which the tube under test may be energized with raw alternating current, such as that supplied by an ordinary lighting circuit, without the necessity for providing a rectifying system to energize the plate and grid. In this embodiment, the primary 87 of the energizing transformer 165 and all of the details of the reversing unit 46, may be substantially as already described.

The filaments may be energized in a similar manner from a similar secondary winding. The alternating current supply for the grid may be taken from a tap 187, connected to the secondary 92, and connected to the rheostat 186. The movable contact arm 188 of rheostat 186 is connected to one end of resistance 189, the other terminal of which is connected by a conductor 190 to one terminal of resistance 191. The same terminal of resistance 191 is connected by a conductor 192 to an adjustable tap of the secondary winding 193, and the opposite terminal of resistance 191 is connected by a conductor 194 to movable contact arm 195.

A condenser 196 is connected by a conductor 197 to the lower terminal of resistance 191 in Fig. 4, and the opposite terminal of the condenser is connected by conductor 198 to the filament supply conductor 93. A voltmeter 28 connected between contact 188 and conductor 198, measures and indicates the absolute value of the alternating voltage applied to resistances 189, 191.

Any number of sockets may be employed with selective switches 195, 199, to energize the grid and plate circuits, respectively, of any socket, and the plate switch 199 is connected by a conductor 200 to commutator brush 45. The opposite commutator brush 47 is connected by a conductor 201 to secondary 193. The screen grid electrode 157 is connected by a conductor 202 to the secondary 193, and both the plate and grid are connected back to the filament by conductor 203, which leads from secondary 193 to a center tap 119 which engages rheostat 120.

The operation of the device of Fig. 4 may be most conveniently explained by reference to Fig. 7, in which the sections of different explanatory curves have been designated $f$, $g$, $h$, $i$.

The filament of a tube in either socket is energized in the usual way from the transformer secondary 92 and alternating potentials are also applied to the plate and grid through conductors 194 and 201. Under such conditions, the tube will be energized entirely by alternating current, and if the reversing unit 46 is not operating, the plate current will be represented by the curves 204 of section $f$ in Fig. 7; that is, the plate current will flow during one-half of the wave when the plate voltage is positive, but no plate current will flow when the plate voltage is negative.

The commutator 65, 66 is preferably adjustably mounted on its shaft 69 in each of the embodiments described, and in this embodiment, the commutator may be set to reverse the wave at its peak instead of the zero point, as previously described. Under such conditions, the plate current flowing through the instrument 75 when the reversing unit 46 is operating, and the tube is energized solely with alternating current in the apparatus of Fig. 4, may be represented by the curves 205 of section $g$ in Fig. 7.

In other words, one-half of the current represented by the curve 204 of section $f$, is reversed in direction, but this current is not indicated on the direct current instrument, due to the fact that it is symmetrical on both sides of zero, and its average value will be equal to zero. Under such conditions the effect of the placing of an alternating current voltage on the grid in phase with the plate as in the previous embodiments, would merely be to increase or decrease the total value of the plate current, and after this plate current has passed through the commutator 65, 66, its average value would still be zero and produce no indication on the direct current instrument 75.

If, however, the alternating voltage which is applied to the grid, is out of phase, an unsymmetrical wave would be the result which would result in a component that is indicated on a direct current instrument. In the present case, a 90° phase shift of the grid voltage is obtained by exciting the grid from a network, as shown in Fig. 4, where the condenser 196 causes the current through resistance 191 to lead the plate voltage by this amount, its absolute value being controlled by rheostat 186 and indicated on voltmeter 28.

The result is an unsymmetrical wave as shown in section $h$ of Fig. 7. The section $h$ curve 205 represents the normal commutated plate current due to the energization of the filament, plate and grid with alternating current, and curve 206 represents the grid voltage as applied 90° out of phase with the plate voltage excitation by virtue of its phase shift through condenser 196. Curve 207 represents the sum of the normal plate current and the increment due to changes in grid voltage by superposing an alternating current on the grid, which is out of phase with the principal energizing alternating current, and this being an unsymmetrical wave, the net result is a direct current component which may be represented by the curves 208 of section $i$ in Fig. 7, when this unsymmetrical current is passed through the commutator.

Referring to Fig. 8, this is a diagrammatic illustration of a relay and solenoid arrangement which may be substituted for the measuring instrument 75 in any of the testing devices described. The relay 209 in such case is energized by the conductors 73, 74, which were used to energize the direct current milliammeter in Figs. 1 to 4, and the relay 209 consists of a direct current relay which will operate on a predetermined current to draw the armature 210 into engagement with contact 211. The armature 210 is normally in engagement with the contact 212, and the contacts 211, 212 lead to the coils 213 and 214, respectively, of a solenoid.

The juncture between the coils 213 and 214 is connected to a common conductor 215, which is connected to an energizing source such as a battery 216, the other terminal of which is connected by a conductor 217 to the armature 210. The solenoid includes a plunger 218 which may be drawn into the coil 214 or 213, depending on which coil is energized, and the solenoid plunger 218 may actuate any sorting device, such as a trough 219, pivotally mounted at 220 at one end, and pivotally secured to solenoid 218 at 221.

The tubes passing down trough 219 are automatically connected in circuit with the testing device by contacts (not shown), and tested by the application of the sources of energy shown in Figs. 1 to 4. If the mutual conductance is below a predetermined value, the current through the relay 209 will not be sufficient to move the armature 210, and the solenoid 214 will be energized to hold the trough in the position of Fig. 8, and the defective tube will be guided to a container 221' for defective tubes.

On the other hand, if the mutual conductance of the tube is a predetermined value equal to or more than the standard desired, the current through direct current relay 209 will be sufficient to draw the armature 210 into engagement with contact 211, energizing coils 213 and drawing plunger 218 and trough 210 to the right to direct the good tubes into a receptacle 222 for tubes of an accepted standard.

The method of determining the mutual conductance, therefore, comprises the energization of the filament, plate and grid of the vacuum tube from appropriate sources, the superimposing of an alternating current on the grid in order to vary the grid potential a predetermined amount, the rectification of the resulting alternating component of the plate current, and the measurement only of this rectified alternating component of the plate current as a direct measure of the mutual conductance of the tube.

The method of measurement of plate resistance comprises the energization of the filament, plate and grid electrodes of the vacuum tube from appropriate sources, superimposing an alternating current upon the plate, rectifying the resulting alternating current increment of plate current only, and measuring the change in plate current for a predetermined change in plate voltage or the change in plate voltage for a predetermined change in plate current. Either of these methods may be practiced with all of the steps or refinements described herein, or they may be practiced in the most simplified form capable of producing the results desired.

The direct current meter and reversing unit constitute a very accurate device for measuring alternating currents and voltages and may also be sold as a separate unit.

It will thus be observed that the present testing device is readily adaptable to the automatic testing of vacuum tubes and to high speed testing, since the mutual conductance may be read directly from a single instrument or the apparatus may be so arranged as to accept or reject tubes according to a standard of mutual inductance. The present measuring instrument is more accurate than the devices of the prior art, due to the fact that it enables the use of a direct current instrument of the d'Arsonval type, which is more sensitive and which has a lower resistance and a higher torque than dynamometer instruments, and the present arrangement is also more accurate, because the measuring instrument is calibrated to measure only the increment of plate current, which is due to change in grid voltage, as distinguished from the measurement of the full value of the plate current.

The accuracy of tests for mutual conductance or plate resistance made with the present apparatus and according to the present method, compares favorably with the results which are secured by very complicated laboratory apparatus, but the testers constructed according to the present invention may be embodied in relatively small and compact portable form, if desired.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. The method of determining the mutual conductance of an electron tube, comprising energizing the filament, plate and grid of the tube, superposing an alternating potential on the grid, mechanically rectifying the resulting alternating component of the plate current, and measuring the said rectified component on an instrument calibrated in terms of mutual conductance.

2. The method of determining the plate resistance of an electron tube comprising energizing the filament, plate and grid of a tube, superposing an alternating potential on the plate, rectifying the resulting alternating component of the plate current, and indicating the value of said rectified component in terms of plate resistance.

3. In an electron tube tester, the combination of means for energizing the electron tube, with an alternating current source for superposing an alternating potential on the grid, a rectifier synchronously operable with said alternating current source for rectifying the resulting alternating component of the plate current, and a meter calibrated in terms of mutual conductance for indicating the value of said rectified component.

4. In an electron tube tester, the combination of means for energizing the electron tube, with an alternating current source for superposing an alternating potential on the grid, a rectifier synchronously operable with said alternating current source for converting the direct current component of the plate current to alternating current, and the alternating component of the plate current to direct current, and a direct current measuring instrument calibrated in terms of mutual conductance for measuring the latter direct current.

5. In an electron tube tester, the combination of means for energizing the electron tube with an alternating current source for superposing an alternating potential on the plate, a rectifier for rectifying the resulting alternating component of the plate current, and a meter calibrated in terms of plate resistance for measuring said rectified component.

6. In an electron tube tester, the combination of means for energizing an electron tube with a step down transformer for superposing an alternating potential on the grid, an instrument calibrated in terms of mutual conductance, and a commutator synchronously operated with said alternating potential for periodically reversing the connection of said instrument to the plate circuit.

7. In an electron tube tester, the combination of a transformer having energizing windings for the filament of a tube, with a rectifier energized from said transformer for impressing a direct potential on the plate and grid of the tube, transformer windings for superposing an alternating potential on the grid, a rectifier in the plate circuit synchronously operated with said alternating current potential, and a direct current meter calibrated in terms of mutual conductance for measuring the value of the resulting alternating current component of the plate current.

8. In an electron tube tester, the combination of a direct current milliammeter having scales calibrated in terms of mutual conductance and plate resistance, with a rectifier for rectifying predetermined components of current passing through said milliammeter, means for energizing the tube and superposing an alternating potential on an electrode of the tube, and selective switch means for impressing said alternating potential on the grid or plate to measure mutual conductance or plate resistance with said milliammeter.

9. In an electron tube tester, the combination of a source of alternating current having appropriate connections for energizing the filament, plate and grid of a tube, with means for shifting the phase of the voltage applied to the grid, a direct current milliammeter, and a rectifier for rectifying an alternating component of the plate current to be measured by said milliammeter as an indication of the mutual conductance of the tube.

10. In a tube tester for electron tubes, the combination of a synchronous motor with an alternating current source, a milliammeter calibrated in terms of mutual conductance, a commutator driven by said motor, contacts engaging said commutator and connected to said milliammeter, commutator contacts connected in the plate circuit, and means for impressing an alternating potential from said source on the grid, whereby the resulting alternating component of the plate current is measured by said milliammeter.

11. In a tube tester for electron tubes, the combination of a synchronous motive device, with a milliammeter, a rectifier driven by said synchronous motive device and connected to said milliammeter, means for energizing the electrodes of an electron tube, and an alternating current source for operating said synchronous motive device and impressing an alternating potential on an electrode of the tube, whereby said milliammeter will indicate directly one of the characteristics of said tube.

12. In a tube tester, the combination of a direct current measuring instrument with a rectifier, means for energizing a tube, means for impressing an alternating potential on the grid, and means for operating said rectifier synchronously with said alternating potential whereby the rectified alternating component of the plate current actuates said instrument to indicate the worth of the tube.

13. In a tube tester for electron tubes, means for exciting the filament, plate and grids, means for applying an alternating voltage to the grid, a commutating device in the plate circuit functioning synchronously with the alternating grid voltage, a direct current instrument for reading the resulting rectified alternating current component of plate current, means for applying an alternating voltage to the plate to result in alternating plate current in reverse phase to that caused by the alternating grid voltage, and a voltmeter actuated by said alternating plate voltage and indicating in terms of amplification constant.

14. In a tube tester, the combination of means for exciting the electrodes of a tube, comprising a source of alternating current, means in the plate circuit for selectively indicating the value of an alternating current component and means for supplying an alternating grid signal voltage, out of phase with the normal alternating current voltages of said tubes, comprising a condenser connected between the grid circuit and electrode of said tube to supply a voltage component in quadrature with the other voltages applied.

15. In a tube tester, the combination of a source of alternating current with appropriate connections for exciting the electrodes of a tube with predetermined voltages, means in the plate circuit for selectively measuring an alternating component in said circuit, and means for impressing upon the grid a voltage ninety degrees out of phase with the other voltages applied to said tube to effect a more accurate measurement of the characteristics of the tube.

JOHN H. MILLER.

DISCLAIMER 1,957,074.—*John H. Miller*, Oak Park, Ill. METHOD AND APPARATUS FOR TESTING THERMIONIC TUBES. Patent dated May 1, 1934. Disclaimer filed September 4, 1936, by the patentee; the assignee, *Jewell Electrical Instrument Company*, assenting.

Hereby enters this disclaimer of claim 5 of said patent.

[*Official Gazette September 29, 1936.*]

whereby the resulting alternating component of the plate current is measured by said milliammeter.

11. In a tube tester for electron tubes, the combination of a synchronous motive device, with a milliammeter, a rectifier driven by said synchronous motive device and connected to said milliammeter, means for energizing the electrodes of an electron tube, and an alternating current source for operating said synchronous motive device and impressing an alternating potential on an electrode of the tube, whereby said milliammeter will indicate directly one of the characteristics of said tube.

12. In a tube tester, the combination of a direct current measuring instrument with a rectifier, means for energizing a tube, means for impressing an alternating potential on the grid, and means for operating said rectifier synchronously with said alternating potential whereby the rectified alternating component of the plate current actuates said instrument to indicate the worth of the tube.

13. In a tube tester for electron tubes, means for exciting the filament, plate and grids, means for applying an alternating voltage to the grid, a commutating device in the plate circuit functioning synchronously with the alternating grid voltage, a direct current instrument for reading the resulting rectified alternating current component of plate current, means for applying an alternating voltage to the plate to result in alternating plate current in reverse phase to that caused by the alternating grid voltage, and a voltmeter actuated by said alternating plate voltage and indicating in terms of amplification constant.

14. In a tube tester, the combination of means for exciting the electrodes of a tube, comprising a source of alternating current, means in the plate circuit for selectively indicating the value of an alternating current component and means for supplying an alternating grid signal voltage, out of phase with the normal alternating current voltages of said tubes, comprising a condenser connected between the grid circuit and electrode of said tube to supply a voltage component in quadrature with the other voltages applied.

15. In a tube tester, the combination of a source of alternating current with appropriate connections for exciting the electrodes of a tube with predetermined voltages, means in the plate circuit for selectively measuring an alternating component in said circuit, and means for impressing upon the grid a voltage ninety degrees out of phase with the other voltages applied to said tube to effect a more accurate measurement of the characteristics of the tube.

JOHN H. MILLER.

DISCLAIMER 1,957,074.—*John H. Miller*, Oak Park, Ill. METHOD AND APPARATUS FOR TESTING THERMIONIC TUBES. Patent dated May 1, 1934. Disclaimer filed September 4, 1936, by the patentee; the assignee, *Jewell Electrical Instrument Company*, assenting.

Hereby enters this disclaimer of claim 5 of said patent.

[*Official Gazette September 29, 1936.*]